United States Patent
Bosselmann et al.

(10) Patent No.: US 9,157,780 B2
(45) Date of Patent: Oct. 13, 2015

(54) DEVICE GENERATING EXHAUST GAS, ESPECIALLY A BOAT, COMPRISING A SYSTEM FOR DETERMINING THE VOLUME OF EXHAUST GAS

(75) Inventors: Thomas Bosselmann, Marloffstein (DE); Rainer Hartig, Buxtehude (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 869 days.

(21) Appl. No.: 13/498,638

(22) PCT Filed: Sep. 28, 2010

(86) PCT No.: PCT/EP2010/064300
§ 371 (c)(1),
(2), (4) Date: Mar. 28, 2012

(87) PCT Pub. No.: WO2011/039153
PCT Pub. Date: Apr. 7, 2011

(65) Prior Publication Data
US 2012/0186570 A1    Jul. 26, 2012

(30) Foreign Application Priority Data
Sep. 29, 2009  (DE) .......................... 10 2009 043 345

(51) Int. Cl.
*G01M 15/10* (2006.01)
*G01F 1/688* (2006.01)
*G01K 11/32* (2006.01)

(52) U.S. Cl.
CPC .......... *G01F 1/6884* (2013.01); *G01K 11/3206* (2013.01); *G01K 2205/04* (2013.01)

(58) Field of Classification Search
USPC .............................. 73/114.69, 114.71, 114.75
See application file for complete search history.

(56) References Cited

U.S. PATENT DOCUMENTS

| 5,357,795 A | 10/1994 | Djorup |
| 5,979,423 A * | 11/1999 | Poindexter et al. ........... 123/697 |

(Continued)

FOREIGN PATENT DOCUMENTS

| CN | 1836092 A | 9/2006 |
| DE | 19821956 A1 | 11/1999 |

(Continued)

OTHER PUBLICATIONS

"Monitoring of inhomogeneous flow distributions using fibre-optic Bragg grating temperature sensor arrays", I. Latka et al., Proceedings of Spie—the International Society for Optical Engineering—Optical Sensing II, Apr. 3, 2006, vol. 6189, XP040223478, ISSN: 0277-786X, DOI: 10.1117/12.668899; Magazine; 2006.

(Continued)

*Primary Examiner* — Eric S McCall
(74) *Attorney, Agent, or Firm* — Harness, Dickey & Pierce, P.L.C.

(57) ABSTRACT

A device for generating exhaust gas including a exhaust gas channel and a system. The system includes: a plurality of Bragg gratings distributed in positions transversely to the direction of flow of an exhaust gas at the end of the exhaust gas channel; an optical wave guide structure includes at least one optical wave guide and the Bragg gratings; and a heating device arranged adjacently to the Bragg gratings and through which the Bragg gratings are subjected to heat, or a cooling device arranged adjacently to the Bragg gratings, through which the Bragg gratings can be subjected to cold. The optical wave guide structure and the heating device or the cooling device are arranged at the end of the exhaust gas channel at a distance from an outlet of the exhaust gas into the surroundings of the device.

24 Claims, 6 Drawing Sheets

(56) References Cited

U.S. PATENT DOCUMENTS

| | | | |
|---|---|---|---|
| 6,271,522 B1 | 8/2001 | Haschberger et al. | |
| 6,986,276 B2 | 1/2006 | Gysling et al. | |
| 7,263,882 B2 | 9/2007 | Sparks et al. | |
| 7,302,844 B2 | 12/2007 | Birkle | |
| 7,336,862 B1 | 2/2008 | Xai et al. | |
| 7,899,647 B2 | 3/2011 | Adam | |
| 2006/0010973 A1 | 1/2006 | Brown | |
| 2006/0117844 A1 | 6/2006 | Birkle | |
| 2006/0245914 A1 | 11/2006 | Gottfried | |
| 2009/0165551 A1 | 7/2009 | Bosselmann | |
| 2010/0287906 A1* | 11/2010 | Xia et al. | 60/39.091 |
| 2010/0290733 A1* | 11/2010 | Xia et al. | 385/12 |
| 2012/0180548 A1* | 7/2012 | Bosselmann | 73/23.31 |
| 2014/0064332 A1* | 3/2014 | Johnston | 374/161 |

FOREIGN PATENT DOCUMENTS

| | | |
|---|---|---|
| DE | 10251701 A1 | 6/2004 |
| DE | 102006012229 B3 | 6/2007 |
| DE | 102007019927 B3 | 9/2008 |
| EP | 1510656 A1 | 3/2005 |
| WO | WO 2004042326 A2 | 5/2004 |

OTHER PUBLICATIONS

German Office Action for German Application No. DE 10 2009 043 345.7 (Not Yet Published).

\* cited by examiner

DEVICE GENERATING EXHAUST GAS, ESPECIALLY A BOAT, COMPRISING A SYSTEM FOR DETERMINING THE VOLUME OF EXHAUST GAS

PRIORITY STATEMENT

This application is the national phase under 35 U.S.C. §371 of PCT International Application No. PCT/EP2010/064300 which has an International filing date of Sep. 28, 2010, which designated the United States of America, and which claims priority to German patent application number DE 10 2009 043 345.7 filed Sep. 29, 2009, the entire contents of each of which are hereby incorporated herein by reference.

FIELD

At least one embodiment of the invention generally relates to a device generating exhaust gas, especially a boat, having an exhaust gas channel from which exhaust gas leaves the device into the surroundings of the device, and having a system for determining an exhaust gas volume discharged through the exhaust gas channel to the surroundings.

BACKGROUND

Large stationary and mobile devices, such as fossil fuel power stations, industrial plant or even boats, contribute significantly through the emission of pollutants (e.g. $CO_2$) to climate change and pollution of the environment. It should therefore be expected that the exhaust gas volume of such devices will be determined in the near future in order to monitor the emissions by way of emission certificates.

It is already known in this regard to determine the exhaust gas volume indirectly using operating parameters of the plant, such as fuel consumption, fuel composition, combustion temperature, etc. Data provided by the manufacturer or operator of an exhaust gas generator (e.g. an internal combustion engine or a steam turbine plant) of the device and connections between the operating parameters and the exhaust gas volume are conventionally used as a basis in this connection. However, there is no possibility of neutrally and independently verifying the exhaust gas volume determined in this way.

WO 2004/042326 A2 discloses a measuring element for determining a flow speed of a fluid flowing around the measuring element, having a conductor for guiding an electromagnetic wave along its longitudinal extension and at least one electrical heating element arranged adjacent to the conductor, by means of which the conductor can be subjected to heat. An electromagnetic wave coupled into the conductor is affected according to the temperature of the conductor which is dependent on the flow speed of the fluid.

Latka, I. et al: "Monitoring of inhomogeneous flow distributions using fiber-optic Bragg grating temperature sensor arrays", PROCEEDINGS OF SPIE—THE INTERNATIONAL SOCIETY FOR OPTICAL ENGINEERING—OPTICAL SENSING II, discloses a measuring system having fiber Bragg grating sensors for determining an inhomogeneous flow speed distribution in a flowing gas.

EP 1510656 A1 discloses a method and a system for detecting an operating state during operation of a turbine in which a hot exhaust gas flows through an exhaust gas casing and the temperature of the exhaust gas in the exhaust gas casing is detected in a time-resolved manner. A plurality of temperature measured values of the exhaust gas is determined in this way.

DE 19821956 A1 discloses a method for quantitative analysis of gas volumes by means of emission or absorption spectrometry in ultraviolet, visible and infrared spectral ranges. Geometrically defined and reproducibly adjustable observation planes are determined in this connection which are each aligned perpendicularly to the longitudinal axis of an exhaust gas stream and series of measurements with spectral measurements are made, with the optical axis of a spectrometer always being located in an observation plane.

SUMMARY

At least one embodiment of the present invention is directed to an improved exhaust-gas generating device in which the exhaust gas volume can be determined with a high level of accuracy, wherein it should be possible to retrofit even existing devices with the system required for this purpose with little expenditure and the system should be characterized by high ease of maintenance.

Advantageous embodiments are the subject matter of the subclaims.

BRIEF DESCRIPTION OF THE DRAWINGS

The invention and further advantageous embodiments of the invention according to features of the subclaims will be described in more detail below in the figures with reference to example embodiments. In the figures:

DETAILED DESCRIPTION OF THE EXAMPLE EMBODIMENTS

Figure 1:
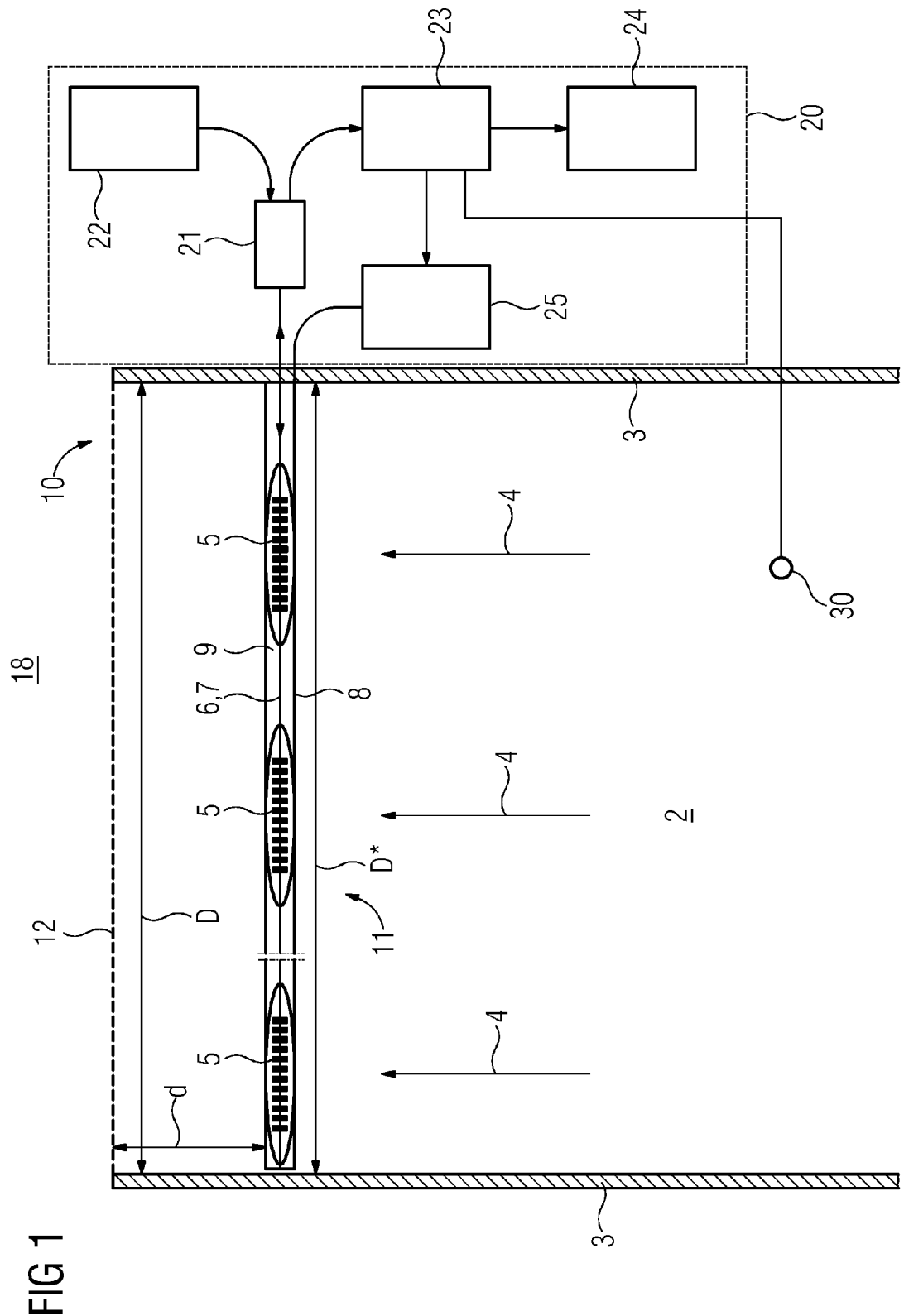
FIG. 1 shows an exhaust gas channel having a system for determining the exhaust gas volume.

For determining the exhaust gas volume an inventive exhaust gas-generating device comprises a system which includes a plurality of Bragg gratings distributed in pre-determined positions transversely to the direction of flow of an exhaust gas at the end of the exhaust gas channel, the gratings being embodied in an optical wave guide structure that consists of at least one optical wave guide, a heating device being arranged adjacently to these Bragg gratings and with which the Bragg gratings are subjected to heat, or a cooling device arranged adjacently to the Bragg gratings, through which the Bragg gratings can be subjected to cold.

If light is coupled into the optical wave guide structure it is scattered back at the Bragg gratings arranged therein counter to its original direction of propagation. The spectrum of light scattered back is dependent on the grating constant of the grating in this connection. The grating constant is in turn dependent on the temperature of the grating. If the Bragg gratings are accordingly heated by the heating device or cooled by the cooling device, some of the heat output or the cooling capacity is removed by an exhaust gas flowing past the gratings. The removed portion is all the greater, the greater the flow speed of the exhaust gas. The temperature of the Bragg gratings is therefore affected by the exhaust gas flowing past the Bragg gratings in the exhaust gas channel, and, more precisely, all the more so the greater the flow speed of the exhaust gas.

The grating constant of the grating also changes as a function of the temperature of the Bragg grating, however. The spectrum of the light scattered back is therefore dependent on the flow speed of the exhaust gas at the Bragg grating. The volume of exhaust gas flowing past the gratings can in turn be derived from the flow speed of the exhaust gas and the area through which the exhaust gas flows.

However, it should be noted in this connection that in large industrial and mobile plants the exhaust gas channels can have a very large cross-sectional area of up to several square meters. It can therefore no longer be presumed that there is a homogeneous flow of exhaust gas over the entire cross-section. Point by point measurement would not be sufficient therefore. A plurality of Bragg gratings is therefore distributed in pre-determined positions transversely to the flow direction of the exhaust gas, i.e. in a cross-sectional area of the exhaust gas channel. Distributed flow measurement of the exhaust gas over the entire cross-sectional area of the exhaust gas channel is possible as a result, whereby a high level of accuracy can be attained when determining the exhaust gas volume even in the case of inhomogeneous exhaust gas flows. Since optical wave guides have a very small diameter and consequently a low flow resistance, the optical wave guide structure constitutes a negligible flow resistance for the exhaust gas flow for such a distributed flow measurement, so operation of the plant is not affected by determination of the exhaust gas volume. The exhaust gas volume can therefore be determined directly and independently of manufacturer or operation information, and with a high level of accuracy.

The at least one optical wave guide is preferably formed by a glass fiber since this is characterized by high resistance to physical and/or chemical stresses and in particular has a high temperature resistance. The optical wave guide can, however, also be formed by a plastic fiber depending on the application.

Since the optical wave guide structure and the heating device or cooling device are arranged at the end of the exhaust gas channel, retrofitting can take place with little expenditure even in existing devices since no interventions are required in the inner region of the exhaust gas channel for this purpose. Accessibility for maintenance is also ensured.

According to at least one embodiment of the invention the optical wave guide structure and the heating device or cooling device are not arranged directly on the outlet of the exhaust gas into the surroundings but at a distance therefrom. This is based on the knowledge that the exhaust gases are swirled even in the region just before egress of the exhaust gas to the surroundings by the ambient air flowing past the outlet and are therefore deflected from their normal flow direction, which preferably runs perpendicular to the optical wave guide structure. The exhaust gases can also be mixed with exhaust gases from other closely adjacent chimneys here. Both effects would lead to inaccuracies in the measurement of the exhaust gas volume. A distance from the outlet can ensure that the exhaust gas flows unaffected onto the optical wave guide structure and the heating device or cooling device and is not mixed with other exhaust gases, so a high level of accuracy can be attained in the measurement of the exhaust gas volume.

The following preferably applies for the spacing: $d>D/10$, preferably $D>d>D/10$, with d being the distance from the outlet and D being the diameter of the outlet. A sufficient distance for a perpendicular inflow onto the optical wave guide structure, which is unaffected by other exhaust gases, by the exhaust gas and at the same time good accessibility to the optical wave guide structure at the end of the exhaust gas channel can be achieved hereby.

The distance of the optical wave guide structure and the heating device or cooling device from the outlet of the exhaust gas can be given by their arrangement in the interior of the exhaust gas channel.

Alternatively and/or additionally the spacing can also be given at least partially by an exhaust gas port which is also placed on the exhaust gas channel.

The exhaust gas port is advantageously a component of the system for determining the exhaust gas volume.

According to a particularly advantageous embodiment the at least one optical wave guide is arranged in a cavity of a rigid support body whose shape determines the course of the optical wave guide in the exhaust gas channel, with the support body simultaneously forming the heating device or cooling device. High mechanical stability and protection of the optical wave guide structure against aggressive exhaust gases is provided hereby, this embodiment also being characterized by particular constructional simplicity since the support body also forms the heating device or cooling device. If the support body also forms the heating device it is preferably made from a metal tube which can be heated by an electrical current flow.

Good distribution of the Bragg gratings for accurate measurement of the exhaust gas volume with simultaneously good mechanical stability and low flow resistance for the exhaust gas is possible with a simple construction in that the optical wave guide structure comprises a plurality of intersecting optical wave guide sections, which form an optical wave guide net, the optical wave guide net comprising meshes with a mesh width, wherein the following preferably applies for the mesh width: $D^*/3>W>D^*/10$, wherein W is the mesh width and $D^*$ is the diameter of the exhaust gas channel or exhaust gas port in the region of the optical wave guide net. The optical wave guide net may also be formed by a single optical wave guide. Basically the optical wave guide structure can however also have a different design, for example it can have a helically or circularly running optical wave guide in which the Bragg gratings are successively arranged.

For mechanically stable securing of the optical wave guide structure and the heating device or cooling device these are preferably surrounded by a frame.

The frame can then be secured to the exhaust gas channel at the end of or in the interior thereof. Alternatively the frame can be held in the interior of the exhaust gas channel by a holding device, the holding device being secured to the end of the exhaust gas channel.

The frame can also be connected by a hinge to a securing element which is secured to the exhaust gas channel. The frame can then be tilted away from the outlet of the exhaust gas channel by means of the hinge, so the exhaust gas channel is accessible for testing and cleaning measures and simple maintenance of the optical wave guide structure and heating device or cooling device is possible.

Since exhaust gas particles can deposit on the support body over the course of time, the system for determining the exhaust gas volume advantageously comprises a cleaning system for cleaning an outer surface of the optical wave guide structure and/or the heating device or cooling device.

For determining measured values relating to the flow speeds at the Bragg gratings and the further evaluations the system for determining the exhaust gas volume preferably comprises at least one light source for irradiating light into the optical wave guide structure and at least one signal processing device, which, from light scattered back from Bragg gratings in the optical wave guide structure counter to its original direction of propagation, determines the flow speed of the exhaust gas along the course of the optical wave guide structure and from this derives the exhaust gas volume flowing past the exhaust gas channel.

According to a further advantageous embodiment the heating device or cooling device can be deactivated for a measurement of the exhaust gas temperature. From the determined flow speeds the mass of the exhaust gas can then also be determined from the density of the exhaust gas. The density corresponds in a first approximation to the density of air, although the temperature dependency of the density must be taken into account. The exhaust gas temperature or an exhaust gas temperature distribution can also be determined very easily however with the aid of the spectrum of light scattered back at the Bragg gratings of the optical wave guide structure. This is possible in that the Bragg gratings are not heated or cooled for a predefined time, so they exhibit the temperature of the exhaust gas.

According to a further advantageous embodiment the exhaust gas-generating device also comprises at least one sensor for measuring a concentration of a pollutant in the exhaust gas and an evaluation unit which is designed in such a way that it determines a pollutant emission of the plant using at least one measured value for a concentration of a pollutant in the exhaust gas and a determined exhaust gas volume.

According to a particularly advantageous embodiment the exhaust-gas generating device comprises an exhaust gas generator (for example an internal combustion engine or a steam turbine plant) having a controller and/or regulator for this exhaust gas generator, the controller and/or regulator being designed in such a way that it controls or regulates the operation of the exhaust gas generator as a function of a determined exhaust gas volume, a determined exhaust gas temperature and/or a determined pollutant emission.

FIG. 1 shows in a schematic section a chimney 3 of an exhaust gas-generating device (not shown in detail). This device can, by way of example, be a large stationary or mobile plant, such as a power station, an industrial plant or in particular a boat. The chimney 3 forms an exhaust gas channel 2. This has, by way of example, a circular cross-section. Other cross-sectional geometries of the exhaust gas channel (e.g. rectangular, square, oval), are also conceivable, however.

A system 10 for determining the exhaust gas volume discharged through the exhaust gas channel 2 or chimney 3 to the surroundings 18 of the exhaust gas-generating device includes a sensor unit 11 which is arranged in the exhaust gas channel 2 at the end of the exhaust gas channel 2, and a measuring and evaluation unit connected thereto. The sensor unit 11 includes Bragg gratings 5 which are distributed in pre-determined positions in the exhaust gas channel 2 perpendicular to the flow direction 4 of the exhaust gas and are formed or incorporated in an optical wave guide structure 6. To simplify the illustration the optical wave guide structure 6 includes only one optical wave guide 7 running in a straight line here. In practice, however, it preferably includes a plurality of optical wave guides or even a single optical wave guide with a substantially non-linear course. A flexible glass fiber cable is preferably used as the optical wave guide.

The optical wave guide 7 is arranged in a rigid support body in the form of a thin-walled tube 8 made of metal which is arranged in the exhaust gas channel 2 perpendicular to the flow direction of the exhaust gas and whose shape determines the course of the optical wave guide 7 in the exhaust gas channel 2. The optical wave guide 7 is interchangeably arranged in a cavity 9 of the tube 8 and is protected against direct contact with the exhaust gas by the tube 8.

If a current flows through the tube 8, it heats up and in the process serves as a heating device for the optical wave guide 7. The optical wave guide 7 is uniformly heated by the tube 8 along its entire length to a temperature which is, by way of example, 50-100° C. above the temperature of the exhaust gas in the region of the sensor unit 11. Tubes made of a high temperature-resistant nickel-based alloy (such as an Inconel alloy) with an external diameter of 1.5 mm and an internal diameter of 0.5 mm can be used as steel tubes by way of example and these have temperature resistances of 600° C. and above. Alternatively a heating wire can also be arranged in the tube 8 to heat the optical wave guide 7, or a warm fluid can flow through the tube 8.

The measuring and evaluation unit 20 comprises an optical directional coupler 21, a light source 22, a signal processing device 23, a display unit 24 and a power source 25. The optical wave guide 7 is connected by the optical directional coupler 21 to the light source 22 and to the signal processing device 23. The directional coupler 21 couples light irradiated by the light source 22 into the optical wave guide 7 and from there couples back-scattered light to the signal processing device 23. The display unit 24 is connected downstream of the signal processing device 23. The power source 25 is used to supply the tube 8 with power and can be activated and deactivated by the signal processing device 23. When the power source 25 is activated the tube 8 heats the optical wave guide 7, together with the Bragg gratings 5, uniformly along its entire length.

The Bragg gratings 5 are formed along the optical wave guide 7 in predetermined positions therein with identical or different grating periods. If Bragg gratings 5 with different grating periods are used, a broadband irradiating light source 22 is used. If, on the other hand, Bragg gratings with identical or substantially identical grating periods are used, a pulsed, monochromatic light source 22 is preferably used. The Bragg gratings 5 consist of a periodic sequence of disk-like regions which have a refractive index that differs from the normal refractive index of a core of the optical wave guide 7.

If in Bragg gratings 5, which, by way of example, have different grating periods, light is irradiated with a broadband distribution of the intensity over the wavelength, a small portion of the light is then scatted back at the Bragg gratings and, more precisely, with a characteristic spectral intensity distribution in each case, and this depends on the grating periods of the respective grating.

A local change in the temperature of the optical wave guide 7 in the region of a Bragg grating 5 leads to a local length expansion or contraction and therewith to a change in the grating periods, and this leads to a displacement of the spectral intensity distribution of the back-scattered light. The extent of this displacement is a measure of the change in length and therewith the change in temperature.

To measure the exhaust gas volume by means of the wave guide structure a temperature measurement of the Bragg gratings 5 is firstly made. The flow speed of the exhaust gas in the exhaust gas channel 2 is then inferred from the temperature of the Bragg gratings 5, and from this the exhaust gas volume is inferred.

The power source 25 is activated for this purpose and delivers electrical power to the tube 8, and this leads to heating of the optical wave guide 7 with respect to its surroundings and in particular with respect to the exhaust gases as well.

The optical wave guide 7 is in the process heated to a temperature which—without the exhaust gas flowing past—would lie above the temperature of the exhaust gas flowing past the optical wave guide 7. Some of the heat output issuing from the tube 8 is diverted via the exhaust gas flowing past the Bragg gratings, however, so the Bragg gratings 5 heat up less than without exhaust gas flowing past. More heat output is diverted the greater the flow speed of the cooler exhaust gas that is flowing past.

The signal processing device 23 contains a spectral analyzer for determining the spectral distribution of the light scattered back from the individual Bragg gratings 5, and a computing device which determines the extent of the respective displacement with respect to a reference layer and converts it into a change in temperature with respect to a reference temperature at which the spectral distribution has the reference layer. This occurs for each individual Bragg grating 5, so the distribution of the temperature along the entire optical wave guide 7 is thus obtained at the points provided with the Bragg gratings 5.

Using these temperatures the flow speed of the exhaust gas along the entire optical wave guide 7 can be determined in the signal processing device 23 at the points provided with Bragg gratings 5 and from this the exhaust gas volume flowing through the exhaust gas channel 2 can be derived and output on the display unit 24. The total cross-sectional area of the exhaust gas channel in the region of the optical wave guide structure 6 is divided into partial areas around the various Bragg gratings 5. The exhaust gas volume flowing through the partial area can be determined from the flow speed measured using a Bragg grating 5 of a partial area, and the area of the partial area. The totals of the exhaust gas (partial) volumes flowing through all partial areas then provides the total exhaust gas volume flowing past.

The accuracy can be increased still further if the flow speed between the various measuring points is also interpolated and the flow speed distribution over the partial areas is therefore taken into account. Flow measurement distributed over the entire flow cross-sectional area rather than point by point measurement is therefore carried out. This allows a high level of accuracy in the determination of the exhaust gas volume, even with cross-sectional areas of the exhaust gas channel 2 of several square meters, without an appreciable change in the flow resistance occurring in the exhaust gas channel 2. With small cross-sectional areas of the exhaust gas channel 2, a single Bragg grating may, by contrast, be sufficient for determination of the exhaust gas volume, i.e. a single optical wave guide with just a single Bragg grating is then already sufficient for determination of the exhaust gas volume.

When using Bragg gratings 5 with identical or substantially identical grating periods the signal processing device 23 also has an electronic evaluation device which detects and evaluates the running time of the back-scattered light with changed spectral intensity distribution. To achieve a time-resolved measurement established OTDR (Optical Time Domain Reflectometry) engineering can be used, as is used for quality assessment in communications engineering.

Instead of a heating device in the form of a tube 8, a cooling device may also be used by which the optical wave guide 7 and the Bragg gratings 5 embedded therein can be subjected to cold. A fluid flowing through the tube 8 can be used by way of example as coolant. The Bragg gratings 5 can then be cooled to a temperature which—without the exhaust gas flowing past—would lie below the temperature of the exhaust gas. Some of the cooling capacity issuing from the cooling device 19 is diverted via the exhaust gas flowing past the Bragg gratings 5, however. More cooling capacity is diverted the greater the flow speed of the warmer exhaust gas that is flowing past. Using the temperatures measured at the Bragg gratings the flow speeds can thus be determined and the exhaust gas volume can be derived from this in the signal processing device 23.

The sensor unit 11 particularly advantageously comprises another sensor 30 for determining the concentration of pollutants, such as CO2, NOx or sulfur in the exhaust gases. The sensor 30 is also connected to the signal processing device 23. The signal processing device 23 is used as an evaluation unit which determines a pollutant emission of the plant using a determined exhaust gas volume and a measured value for the concentration of the pollutant in the exhaust gas, and outputs this on the display unit 24. An exhaust gas emission measurement of stationary and mobile plant, especially of boats, can thus be made with low constructional expenditure. The concentration of the pollutant in the exhaust gas can either be measured point by point by means of commercially available measuring devices, or in a distributed manner (e.g. by way of laser absorption spectroscopy). The sensor 30 is arranged upstream of the sensor unit 11 in the flow direction of the exhaust gas, so swirls and exhaust gas mixing in the region of the outlet 12 do not have any effects on the measuring results.

It is advantageous if the heat output to be discharged by the tube 8 can be adjusted. The heat output can be adjusted in this case to the exhaust gas temperature such that temperature differences that can be reliably detected by the signal processing device 23 are established in the optical wave guide 7 without an unnecessary excess of electrical power being used. The adjustment can be made automatically in that, starting from a relatively low initial value, the power fed into the tube by the power source 25 is gradually increased, controlled by the signal professing device 23, until the signal processing device 23 determines clear temperature differences along the optical wave guide 7.

The resolution and therefore accuracy of the exhaust gas volume measurement is predefined by the number of Bragg gratings 5 per unit of area of the exhaust gas channel 2 and the positions of the Bragg gratings 5 along the optical wave guide 7, and can be adjusted to the requirements of the respective application by a suitable design.

The mass of the exhaust gas may also be determined from the determined flow speeds. Only the density of the exhaust gas has to be determined for this purpose. This density corresponds in a first approximation to the density of air, although the temperature dependency of the density must be taken into account. The exhaust gas temperature or an exhaust gas temperature distribution can be determined very easily likewise with the aid of the spectrum of light scattered back at the Bragg gratings 5 of the optical wave guide structure 6. This is possible in that the Bragg gratings 5 are not heated or cooled for a predefined time, so they exhibit the temperature of the exhaust gas. The signal processing device 23 deactivates the power source 25 for heating the tube 8 for a predefined time for this purpose.

The sensor unit 11 is arranged in the exhaust gas channel 2 at a distance d from an outlet 12 of the exhaust gas into the surroundings 18 of the device 1. The following applies for the distance d: $D > d > D/10$, where D is the maximum diameter of the outlet 12.

The measuring and evaluation unit 20 can be arranged in the region of the end of the exhaust gas channel 2 outside of the exhaust gas channel 2 or, by way of example, at the foot of the chimney 3 or in an automation center of the exhaust gas-generating device and can be connected by cables to the sensor unit.

An arrangement, distributed in the exhaust gas channel 2, of the Bragg gratings with good resolution can be achieved by different optical wave guide and tube structures. Examples of this are shown in FIGS. 2 to 6, wherein to simplify illustration of the sensor unit 11 only the optical wave guide structure 6 and the Bragg gratings 5 are shown respectively and the associated tubes are omitted.

Figure 2:
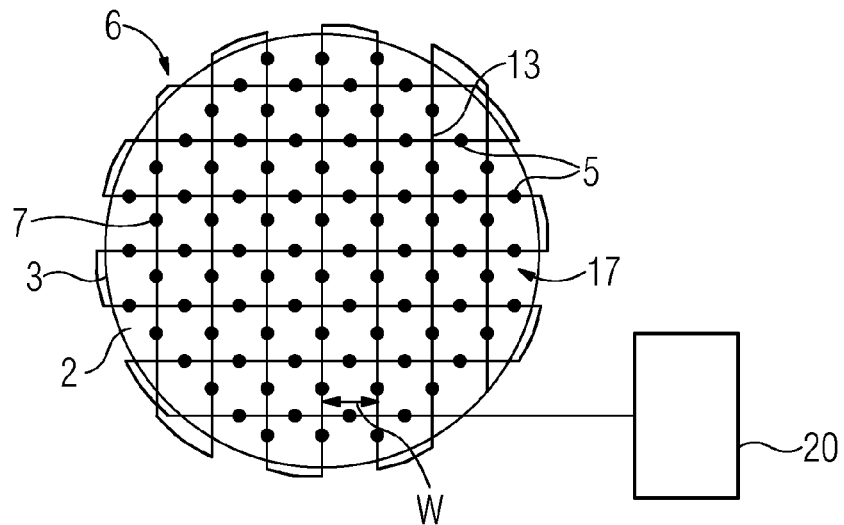
FIG. 2 shows a plan view of a sensor unit designed as a net.

According to FIG. 2 the optical wave guide structure 6 can be formed by a single optical wave guide 7 which runs alternately from one side of the exhaust gas channel 2 to an opposing side and therefore forms an optical wave guide net 17. The optical wave guide net 17 preferably comprises meshes 13 of equal size in each case. Precisely one Bragg grating 5 respectively is arranged between two mesh points. The optical wave guide net 17 comprises meshes 13 with a mesh width W, where the following applies for the mesh width W: $D^*/3 > W > D^*/10$, where $D^*$ is the diameter of the chimney 3 or exhaust gas channel 2 in the region of the optical wave guide net 17. Good resolution when measuring in the case of only slight flow resistance through the exhaust gas is possible as a result.

The optical wave guide structure 6 can, however, also consist by way of example of a single optical wave guide or a plurality of them with a circular or helical course, or of a plurality of intersecting optical wave guide sections.

To increase the redundancy two tubes running adjacently parallel and each with an optical wave guide contained therein or a single tube with two optical wave guides running parallel therein may also be present instead of a single tube having a single optical wave guide contained therein.

Figure 3:
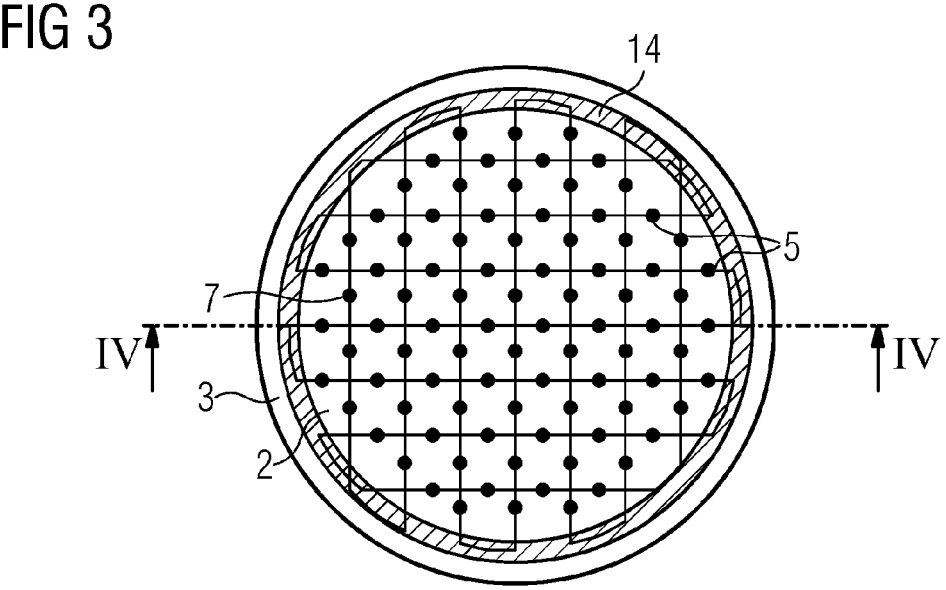
FIG. 3 shows a plan view of the sensor unit of FIG. 2 with a frame.
Figure 4:
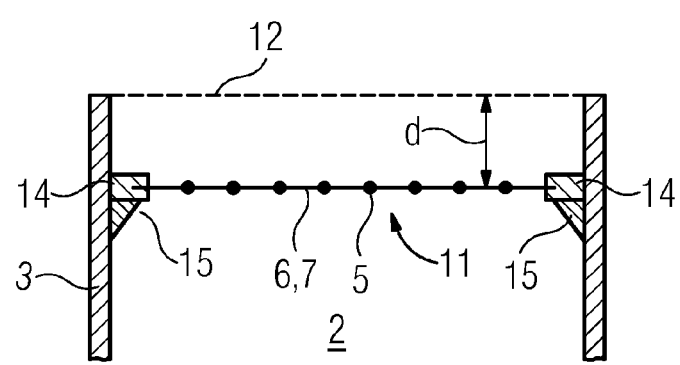
FIG. 4 shows a section along the line IV-IV of FIG. 3.

As shown in FIGS. 3 and 4, the sensor unit 11 can be surrounded by a frame 14 which is secured in the interior of the exhaust gas channel 2 by means of securing elements 15 at a distance d from the outlet 12 of the exhaust gas. The tubes of the sensor unit 11 are preferably secured in the frame 14 so as to be electrically insulated from the frame 14. The frame 14 itself on the other hand is conductively connected to the chimney 3 or exhaust gas channel 2.

Figure 5:
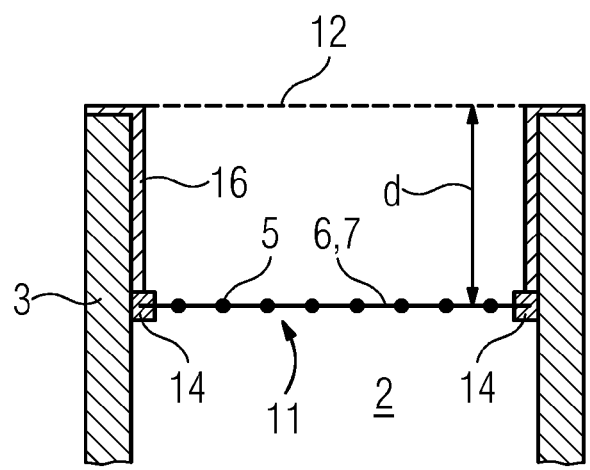
FIG. 5 shows a section through a sensor unit secured by means of a holder.

Alternatively, according to FIG. 5 the frame 14 can also be held in the interior of the exhaust gas channel 2 by a holding device 16 which is secured to the end of the exhaust gas channel 2 or chimney 3.

Figure 6:
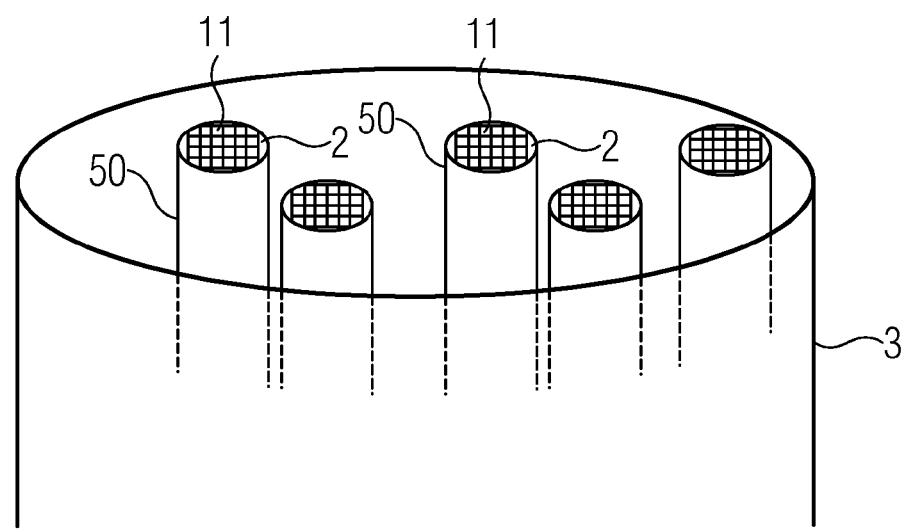
FIG. 6 shows a chimney having a plurality of exhaust gas tubes and sensor units.

If a chimney 3—as shown in FIG. 6—comprises a plurality of exhaust gas tubes 50 each with an exhaust gas channel 2, one sensor unit 11 respectively can be provided for each of the exhaust gas tubes 50. A separate measuring and evaluation unit 20 can then be associated with each sensor unit 11, or a common measuring and evaluation unit 20 can be associated with all sensor units 11.

Figure 7:
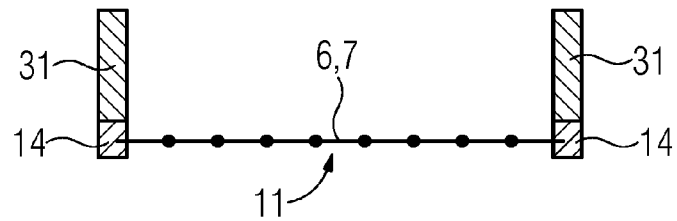
FIG. 7 shows a sensor unit having an exhaust gas port.
Figure 8:
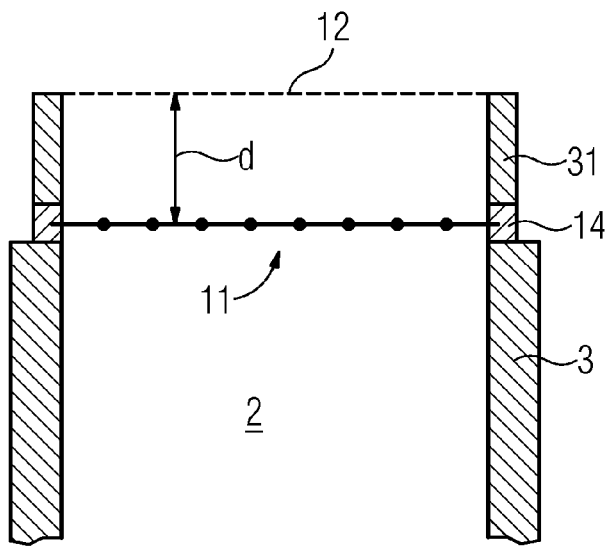
FIG. 8 shows a securing of the sensor unit of FIG. 7 to the end of an exhaust gas channel.

The distance d of the sensor unit 11 form the outlet 12 of the exhaust gas can be also be at least partially achieved according to FIG. 7 in that the sensor unit 11 includes an exhaust gas port 31 which is permanently connected to the frame 14 and—as shown in FIG. 8—is jointly placed on the exhaust gas channel 2 or chimney 3 with the frame 14.

Figure 9:
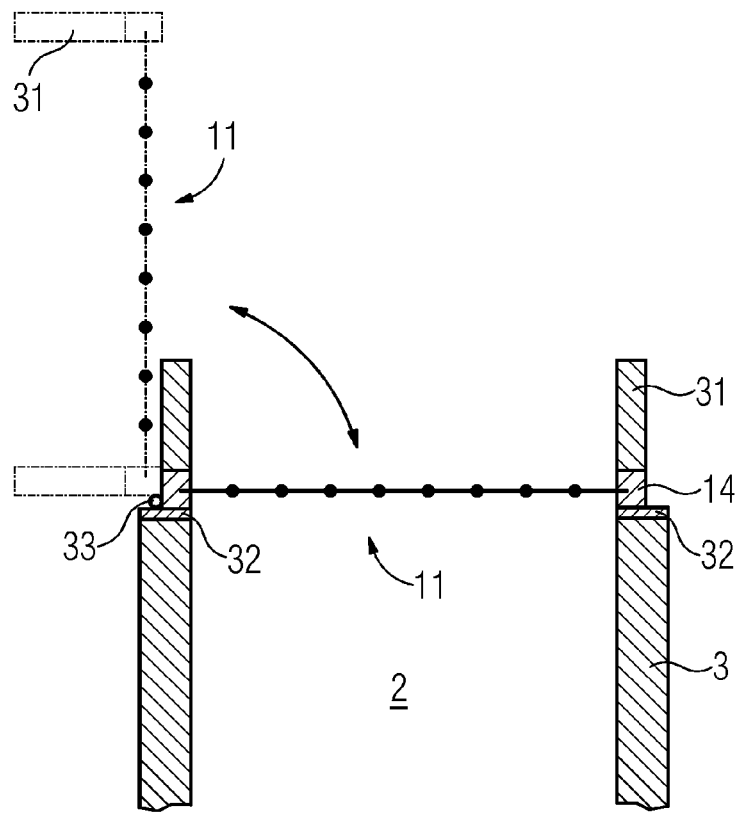
FIG. 9 shows a sensor unit which can be hinged from an exhaust gas channel.

The frame 14 is preferably—as shown in FIG. 9 by way of example for the embodiment of the sensor unit 11 according to FIGS. 7 and 8—secured to the exhaust gas channel 2 or chimney by a securing element 32, with the frame 14 being connected to the securing element 32 by a hinge 33. The frame 14, together with exhaust gas port 31 from the outlet 12 of the chimney 3, can then be tilted from a horizontal position into a vertical position by means of the hinge 33, so the chimney 3 is accessible for inspection and cleaning measures and straightforward maintenance of the sensor unit 11 is possible.

Figure 10:
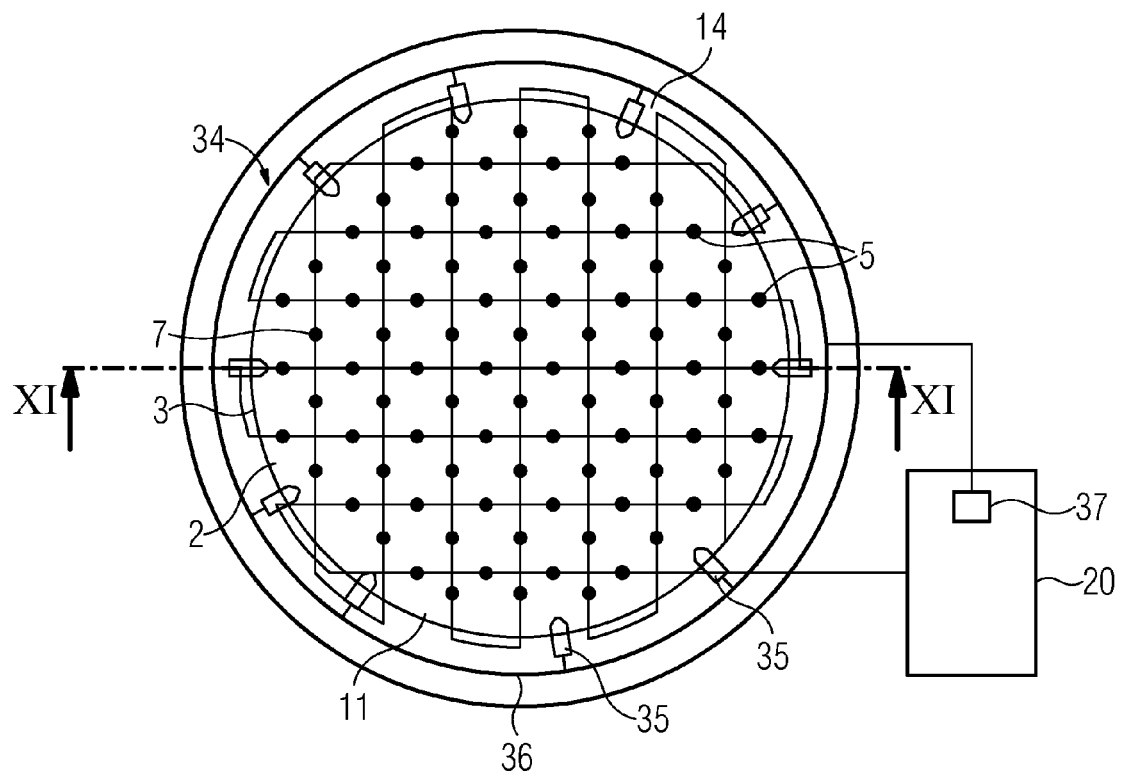
FIG. 10 shows a sensor unit having a cleaning system.
Figure 11:
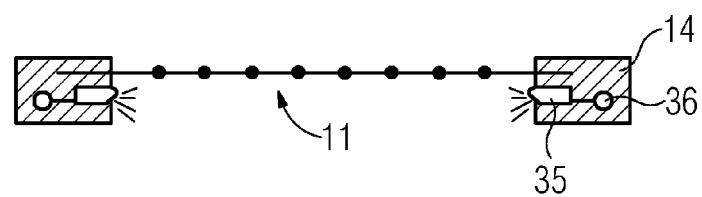
FIG. 11 shows a section along the line XI-XI of FIG. 10.

As FIG. 10 shows in a plan view and FIG. 11 in a section along the line XI-XI of FIG. 10, the sensor unit 11 advantageously includes a cleaning system 34 for cleaning the outer surface of the tubes 8 of the sensor unit 11. The cleaning system 34 includes a plurality of compressed air nozzles 35 arranged in the frame 14 which are uniformly distributed over the circumference of the frame 14 and are connected by a compressed air line 36 to a compressed air source 37 which is arranged in the measuring and evaluation unit 20 and is controlled, by way of example, by the signal processing unit 23. Exhaust gas particles, which may be deposited on the tubes of the sensor unit 11 over the course of time, in particular in the region of the walls of the exhaust gas channel 2 or chimney 3, can be removed by a shot of compressed air. The heat transition resistance between the exhaust gas and the Bragg gratings due to exhaust gas particles deposited on the tubes can be increased hereby, and an accompanying influencing of the measuring results can be avoided therewith. The surface of the tube 8 can also be cleaned by a current pulse in the tube 8, which leads to a brief, strong increase in the temperature of the tube, or mechanically with the aid of brushes instead of using compressed air. Soiling or deposits can be derived by the signal processing unit 23 by way of the connection between fed-in electrical heat output and measured temperature of the Bragg gratings without exhaust gas flowing past.

Figure 12:
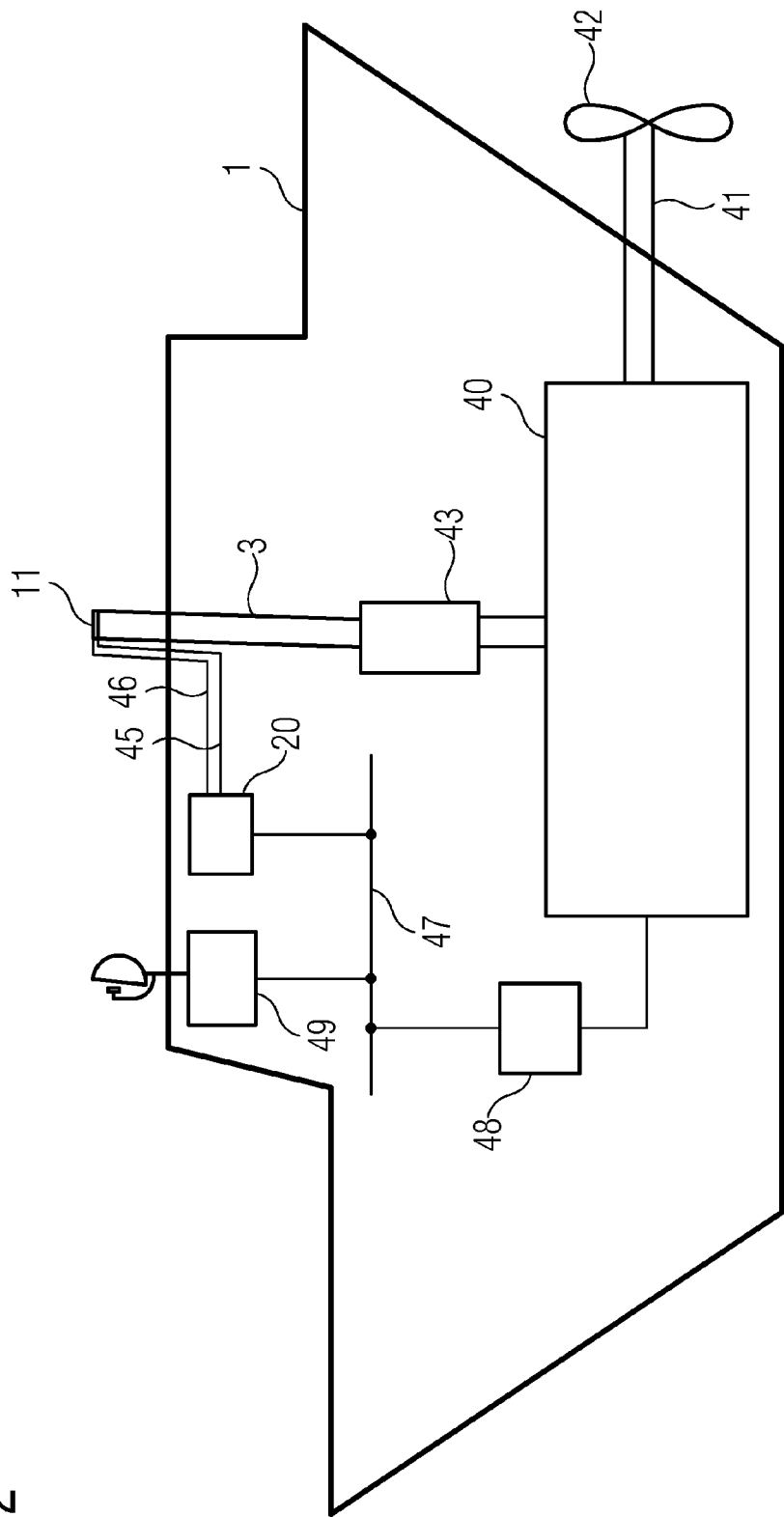
FIG. 12 shows an exhaust gas-generating device having an exhaust gas generator and a controller and/or regulator.

An exhaust gas-generating device 1 in the form of a boat shown in FIG. 12 comprises an exhaust gas generator 40 (e.g. an internal combustion engine or a steam turbine plant) which drives a propeller 42 via a propeller shaft 41. The exhaust gases from the exhaust gas generator 40 are fed to an exhaust gas cleaning system 43 and the cleaned exhaust gases are discharged to the surroundings by way of a chimney 3 with an exhaust gas channel contained therein. A sensor unit 11 of a system for determining the exhaust gas volume is arranged at the end of the chimney 3. The associated measuring and evaluation unit 20 is located in the interior of the boat and is connected to the sensor unit 11 by a glass fiber cable 45 and a power cable 46. The measuring and evaluation unit 20 can be integrated in a higher-order automation system of the boat, by way of example.

A controller and/or regulator device 48 for the exhaust gas generator 40 is coupled by a data link, here a data network 47, to the measuring and evaluation unit 20 and receives measured values for the exhaust gas volume, exhaust gas temperature and/or pollutant emission therefrom. The controller and/or regulator 48 is designed in such a way that it controls or regulates operation of the exhaust gas generator 40 as a function of the determined exhaust gas volume, the determined exhaust gas temperature and/or the determined pollutant emission and therefore optimizes operation of the exhaust gas generator 40. By way of example the exhaust gas generator 40 can be controlled or regulated at an operating point with a minimal exhaust gas volume and/or minimal pollutant emission. A diagnosis and status monitoring system 49 is also connected to the data network and this also receives the measured values for the exhaust gas volume, exhaust gas temperature and/or pollutant emission. The diagnosis and status monitoring system 49 stores the measured values, evaluates them and initiates countermeasures in the event of thresholds being exceeded. Transmission of the measured values to remote monitoring centers by satellite communication is also possible.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A device generating exhaust gas, comprising:
an exhaust gas channel from which exhaust gas leaves the device into the surroundings of the device; and
a system configured to determine an exhaust gas volume discharged through the exhaust gas channel to the surroundings,
the system including
a plurality of Bragg gratings distributed in positions transversely to a flow direction of the exhaust gas at an end of the exhaust gas channel, and
an optical wave guide structure in which the Bragg gratings are embodied, the optical wave guide structure including at least one optical wave guide, and
a heating device, arranged adjacently to the Bragg gratings and by which the Bragg gratings are subjected to heat, wherein a thermal output to be emitted by the heating device is adjustable to the exhaust gas temperature, or a cooling device arranged adjacently to the Bragg gratings and by which the Bragg gratings are coolable to a temperature below an exhaust gas temperature, wherein
the optical wave guide structure and the heating or cooling device are arranged in an interior of the exhaust gas channel at the end of the exhaust gas channel at a distance from an outlet of the exhaust gas into the surroundings of the device, wherein the following applies of the distance (d): d>D/10, where d is the distance (d) from the outlet and D is the diameter of the outlet.

2. The device as claimed in claim 1, wherein the at least one optical wave guide is arranged in a cavity of a rigid support body whose shape determines the course of the optical wave guide in the exhaust gas channel, the support body simultaneously forming the heating device or cooling device.

3. The device as claimed in claim 1, wherein the optical wave guide structure comprises intersecting optical wave guide sections, which embody an optical wave guide net, the optical wave guide net comprising meshes with a mesh width W, wherein the following applies for the mesh width: $D^*/3 > W > D^*/10$, where W is the mesh width and $D^*$ is the diameter of the exhaust gas channel or exhaust gas port in the region of the optical wave guide net.

4. The device as claimed in claim 1, further comprising:
a cleaning system to clean an outside surface of at least one of the optical wave guide structure and the heating or cooling device.

5. The device as claimed in claim 1, further comprising:
an exhaust gas generator including at least one of a controller and regulator for the exhaust gas generator, the controller and/or regulator being designed to control or regulate operation of the exhaust gas generator as a function of at least one of a determined exhaust gas volume, a determined exhaust gas temperature and a determined pollutant emission.

6. The device as claimed in claim 1, wherein the Bragg gratings along the at least one optical wave guide comprise different grating periods and spectral broadband light are irradiatable into the at least one optical wave guides by way of a light source, or wherein the Bragg gratings along at least one optical wave guide have identical grating periods, it being possible to irradiate pulsed monochromatic light into the at least one optical wave guide by way of a light source and a running time of the back-scattered light is detectable and evaluated by way of a signal processing device.

7. The device as claimed in claim 6, wherein the distance (d) is at least partially given by an exhaust gas port which is also placed on the exhaust gas channel.

8. The device as claimed in claim 1, wherein the distance (d) is at least partially given by an exhaust gas port which is also placed on the exhaust gas channel.

9. The device as claimed in claim 8, wherein the exhaust gas port is a component of the system for determining the exhaust gas volume.

10. The device as claimed in claim 1, wherein
the heating device or the cooling device is activatable for a measurement of the exhaust gas temperature.

11. The device as claimed in claim 10, further comprising:
an exhaust gas generator including at least one of a controller and regulator for the exhaust gas generator, the controller and/or regulator being designed to control or regulate operation of the exhaust gas generator as a function of at least one of a determined exhaust gas volume, a determined exhaust gas temperature and a determined pollutant emission.

12. The device as claimed in claim 1, further comprising:
at least one sensor to measure a concentration of a pollutant in the exhaust gas; and
an evaluation unit, designed to determine a pollutant emission of the plant using at least one measured value for a concentration of a pollutant in the exhaust gas and a determined exhaust gas volume.

13. The device as claimed in claim 12, further comprising:
an exhaust gas generator including at least one of a controller and regulator for the exhaust gas generator, the controller and/or regulator being designed to control or regulate operation of the exhaust gas generator as a function of at least one of a determined exhaust gas volume, a determined exhaust gas temperature and a determined pollutant emission.

14. The device as claimed in claim 1, wherein the following applies for the distance (d): D>d.

15. The device as claimed in claim 14, wherein the Bragg gratings along the at least one optical wave guide comprise different grating periods and spectral broadband light are irradiatable into the at least one optical wave guides by way of a light source, or wherein the Bragg gratings along at least one optical wave guide have identical grating periods, it being possible to irradiate pulsed monochromatic light into the at least one optical wave guide by way of a light source and a running time of the back-scattered light is detectable and evaluated by way of a signal processing device.

16. The device as claimed in claim 14, wherein the distance (d) is at least partially given by an exhaust gas port which is also placed on the exhaust gas channel.

17. The device as claimed in claim 14, further comprising:
at least one light source to irradiate light into the optical wave guide structure; and
at least one signal processing device to, from light scattered back from Bragg gratings in the optical wave guide structure counter to its original direction of propagation, determine a flow speed of the exhaust gas along the course of the optical wave guide structure and to derive the exhaust gas volume flowing through the exhaust gas channel from the determined flow speed.

18. The device as claimed in claim 1, wherein the optical wave guide structure and the heating device or cooling device are surrounded by a frame.

19. The device as claimed in claim 18, wherein the frame is secured to the exhaust gas channel at the end of or inside the exhaust gas channel.

20. The device as claimed in claim 18, wherein the frame is held in the interior of the exhaust gas channel by a holding device, the holding device being secured to the end of the exhaust gas channel.

21. The device as claimed in claim 18, wherein the frame is connected by a hinge to a securing element which is secured to the exhaust gas channel.

22. The device as claimed in claim 1, further comprising:
   at least one light source to irradiate light into the optical wave guide structure; and
   at least one signal processing device to, from light scattered back from Bragg gratings in the optical wave guide structure counter to its original direction of propagation, determines a flow speed of the exhaust gas along the course of the optical wave guide structure and to derive the exhaust gas volume flowing through the exhaust gas channel from the determined flow speed.

23. The device as claimed in claim 22, further comprising:
   at least one sensor to measure a concentration of a pollutant in the exhaust gas; and
   an evaluation unit, designed to determine a pollutant emission of the plant using at least one measured value for a concentration of a pollutant in the exhaust gas and a determined exhaust gas volume.

24. The device as claimed in claim 22, further comprising:
   an exhaust gas generator including at least one of a controller and regulator for the exhaust gas generator, the controller and/or regulator being designed to control or regulate operation of the exhaust gas generator as a function of at least one of a determined exhaust gas volume, a determined exhaust gas temperature and a determined pollutant emission.

* * * * *